United States Patent
Busby et al.

(10) Patent No.: US 8,691,033 B1
(45) Date of Patent: Apr. 8, 2014

(54) POSITIONING A WORKPIECE ON A STICKY GASKET

(75) Inventors: Jeffrey D. Busby, Millsap, TX (US); Douglas J. Smith, Weatherford, TX (US)

(73) Assignee: Aviation Devices & Electronic Components, LLC, Fort Worth, TX (US)

( * ) Notice: Subject to any disclaimer, the term of this patent is extended or adjusted under 35 U.S.C. 154(b) by 3 days.

(21) Appl. No.: 13/533,531

(22) Filed: Jun. 26, 2012

Related U.S. Application Data

(60) Provisional application No. 61/504,882, filed on Jul. 6, 2011.

(51) Int. Cl.
*E04F 13/08* (2006.01)
*B29C 65/48* (2006.01)
*B32B 37/26* (2006.01)
*B32B 38/18* (2006.01)
*B32B 43/00* (2006.01)

(52) U.S. Cl.
USPC ............. 156/71; 156/247; 156/249; 156/289

(58) Field of Classification Search
USPC .................................. 156/71, 247, 249, 289
See application file for complete search history.

(56) References Cited

U.S. PATENT DOCUMENTS

| | | | |
|---|---|---|---|
| 1,851,948 A | 3/1932 | Summers | |
| 2,092,393 A | 9/1937 | Hewitt | |
| 3,126,440 A | 3/1964 | Goodloe | |
| 3,473,813 A | 10/1969 | Meyers | |
| 3,532,349 A | 10/1970 | Czernik | |
| 3,542,939 A | 11/1970 | Mintz | |
| 3,555,168 A | 1/1971 | Frykberg | |
| 3,681,272 A | 8/1972 | Gloskey | |
| 3,993,833 A | 11/1976 | Esmay | |
| 4,037,009 A | 7/1977 | Severinsen | |
| 4,090,988 A | 5/1978 | Babiec | |
| 4,183,699 A | 1/1980 | Donan | |
| 4,325,280 A | 4/1982 | Hardy | |
| 4,544,169 A | 10/1985 | Cobb | |
| 4,635,949 A | 1/1987 | Lucas | |
| 4,835,060 A | 5/1989 | Kosiarski | |
| 4,900,629 A | 2/1990 | Pitolaj | |
| 4,900,877 A | 2/1990 | Dubrow | |
| 5,037,879 A | 8/1991 | Roberts | |
| 5,158,638 A | 10/1992 | Osanami | |
| 5,512,709 A | 4/1996 | Jencks et al. | |
| 5,702,111 A | 12/1997 | Smith | |
| 5,791,654 A | 8/1998 | Gaines et al. | |

(Continued)

FOREIGN PATENT DOCUMENTS

| | | |
|---|---|---|
| JP | 09109346 A | 4/1997 |
| WO | WO 2005/030893 | 9/2004 |

OTHER PUBLICATIONS

"Conductive Elastomer Gasket Design," Chomerics, www.chomerics.com, pp. 1-9.

(Continued)

*Primary Examiner* — Sing P Chan
(74) *Attorney, Agent, or Firm* — Jackson Walker, LLP

(57) ABSTRACT

Applicants provide a step in the assembly of a moveable workpiece to a static base, the base bearing a sticky gasket and in which a release agent is sprayed on the sticky upper surface of the sticky gasket, which release agent will render the sticky surface temporarily unsticky.

9 Claims, 2 Drawing Sheets

(56) References Cited

U.S. PATENT DOCUMENTS

| | | | |
|---|---|---|---|
| 5,890,719 | A | 4/1999 | Bettencourt |
| 5,910,524 | A | 6/1999 | Kalinoski |
| 5,929,138 | A | 7/1999 | Mercer et al. |
| 6,056,526 | A | 5/2000 | Sato |
| 6,121,545 | A | 9/2000 | Peng |
| 6,346,330 | B1 | 2/2002 | Huang et al. |
| 6,364,976 | B2 | 4/2002 | Fletemier |
| 6,365,812 | B1 | 4/2002 | McGill |
| 6,403,226 | B1 | 6/2002 | Biernath et al. |
| 6,530,577 | B1 | 3/2003 | Busby |
| 6,553,664 | B1 | 4/2003 | Schenk |
| 6,695,320 | B2 | 2/2004 | Busby |
| 7,229,516 | B2 | 6/2007 | Busby |
| 7,290,769 | B2 | 11/2007 | Plona |
| 7,314,898 | B2 | 1/2008 | Downing, Jr. et al. |
| 7,654,538 | B2 | 2/2010 | Oka |
| 2002/0135137 | A1 | 9/2002 | Hammi |
| 2005/0023768 | A1 | 2/2005 | Adams |
| 2009/0322040 | A1 | 12/2009 | Banba |
| 2010/0258200 | A1 | 10/2010 | Walker |
| 2011/0156353 | A1 | 6/2011 | Kabutoya et al. |

OTHER PUBLICATIONS

"Technical Data Sheet," PNE 1500101130CR, VTT/Shieldex Trading USA, www.shieldextrading.net/product_INDEX.html, Jun. 7, 2012.
Tecknit, EMI Shielding Products, Mesh & Elastomer Combination Gaskets, www.tecknit.com/meshelas.html, Oct. 13, 2008.
Tecknit, EMI Shielding Products, Oriented Wire Mesh Strip & Gasket Material, www.tecknit.com/orient.html, Oct. 13, 2008.
Tecknit, EMI Shielding Products, Conductive Silicone Elastomers, www.tecknit.com/silelast.html, Oct. 13, 2008.
Loos & Co., Inc., Knitted Wire Mesh, www.loosco.com/index.php?page=knitted-wire-mesh, 3 pages Dec. 7, 2012.

POSITIONING A WORKPIECE ON A STICKY GASKET

This application claims the benefit of, priority from, and incorporates by reference U.S. Provisional Patent Application Ser. No. 61/504,882, filed Jul. 6, 2011.

FIELD OF THE INVENTION

Positioning a workpiece on a tacky or sticky gasket, namely, a workpiece positioning method using a release agent to assist in positioning a workipece on a sticky (to the touch) gasket.

BACKGROUND OF THE INVENTION

Sticky gaskets sometimes present a challenge in the proper positioning of a workpiece against such a gasket, the gasket being against a static base. For example, when a sticky gasket is applied to a static base and a workpiece must be accurately positioned on the base, if the workpiece is placed improperly (non-aligned) against a sticky gasket, it is difficult to remove the workpiece for repositioning properly.

This may be especially difficult in an environment that uses a multiplicity of static longitudinal base elements spaced apart from one another, on which a sticky gasket tape is applied, and on which a workpiece must be accurately placed to align fastener holes in the base with fastener holes in the workpiece. Even a slight misalignment of workpiece/base holes will present difficulty in engaging the fasteners.

While, after a period of time, a skill can be developed which provides proper and accurate alignment for first time placement, there is a need for the ability to easily reposition a workpiece with respect to a base for either the unskilled worker or for those times that even the skilled user may not get the initial alignment just right.

SUMMARY OF THE INVENTION

Applicants provide a step in the assembly of a moveable workpiece to a static base, the base bearing a sticky gasket and in which a release agent is sprayed on the sticky upper surface of the sticky gasket, which release agent will render the sticky surface temporarily unsticky.

Applicants' also provide a method for positioning a removable workpiece on a base with a gasket between the workpiece and the base, the gasket having a skinned side covering a sticky body and an uncovered, sticky side, the method comprising the steps of assembling the gasket, a liquid tack release agent, and a release agent applicator; applying the sticky side of the gasket to the base; removing the skin from the top surface of the gasket; spraying the top surface of the gasket with the release agent; manually laying the workpiece on the wetted top surface of the gasket; aligning the workpiece to a predetermined alignment with the base; and allowing the release agent to dry; wherein the workpiece and the base each have a multiplicity of fastener holes therein and wherein the aligning step includes the step of aligning the holes of the workpiece and the fasteners; wherein the workpiece is an aircraft floor panel and the base is an aircraft stringer; wherein the gasket is a polyurethane gasket tape and the applying step includes applying the gasket tape sticky side down on the stringer; wherein the liquid tack release agent is an alcohol; wherein the gasket has a skeleton and further including, following the removing step, the step of creating holes in the skeleton at any points where the gasket overlaps the holes; and wherein the aligning step further includes the step of placing a member in a pair of aligned holes and moving the workpiece about, the member to align the remaining holes of the workpiece with the holes of the stringer.

DETAILED DESCRIPTION OF THE PREFERRED EMBODIMENT

Figure 1:
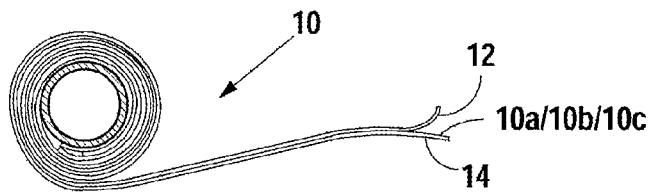
FIG. 1 illustrates in side elevation, a polyurethane gasket tape as one of the gasket materials used in Applicants' method.

The following three patents are incorporated herein by reference: U.S. Pat. Nos. 6,530,577; 6,695,320; and 7,229,516.

Applicants' invention represents the use of an assembly of materials in a working environment for the purpose of the proper, aligned placement of a workpiece to a base with a sticky gasket therebetween and, more particularly, wherein the positioning needs to be accurate and may include the positioning of fastener holes of the workpiece with respect to holes in a base.

Here, Applicants' environment typically comprises an aircraft interior. During the assembly or the inspection/rebuilding of an aircraft interior, aircraft panels 16 may be fastened to a series of spaced apart aircraft stringers 18a/18b/18c. Stringers represent elements of the aircraft frame that support the floor panels and it is often desirable to place a gasket material between the floor panels and the stringers to help with vibration and sound absorption and to provide other beneficial properties. Typically this environment also requires a multiplicity of fasteners 26 for engaging both bolt holes 16a in the floor panel 16 with a multiplicity of holes 19a/19b/19c in stringers 18a/18b/18c, respectively. There may be blind nuts 28 beneath the holes 19a/19b/19c for receiving the fasteners 26 therein.

Figure 5:
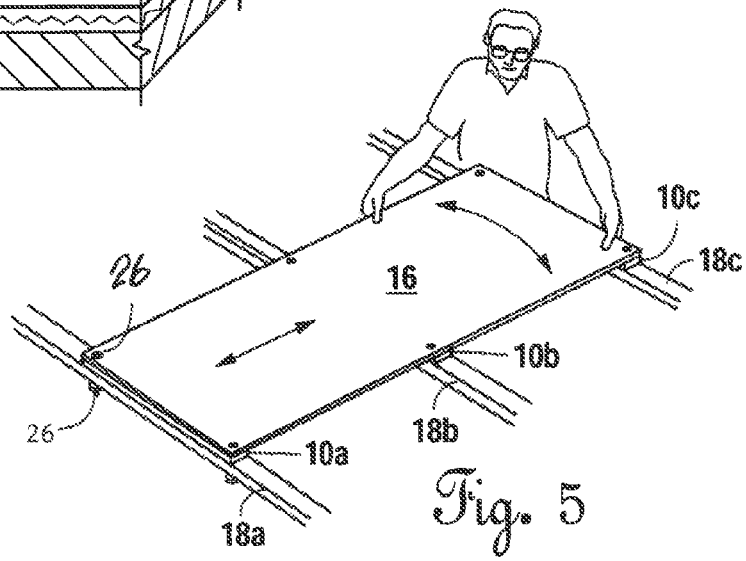
FIG. 5 is a perspective view that represents the alignment step of Applicants' present invention.

In FIG. 5, one can see the almost completed assembly with fasteners 26 ready to be inserted into the fastener holes and with the gasket material sandwiched between the workpiece, here, floor panel 16, and the base, here, stringers 18a/18b/18c.

Thus, Applicants' assemble materials at a worksite, the worksite typically an aircraft interior. The materials for the practicing Applicants' method comprise the gasket material, here, in one embodiment, a polyurethane gasket tape 10 (see FIG. 1), which is simply gasket material in a tape form. This gasket material comprises a sticky body 10a (sticky to the touch) and may have a flexible skeleton (metallic or nonmetallic) 10*b* imbedded therein. The gasket material may be covered with a skin or release tape 12, typically on one side thereof.

The practice of Applicants' method also uses an applicator 22, such as a spray applicator, squeeze bottle, aerosol, brush or the like, for the application of an appropriate tack release agent 24, typically in liquid or droplet form, to the upper surface of body 14 of gasket.

Figure 2:
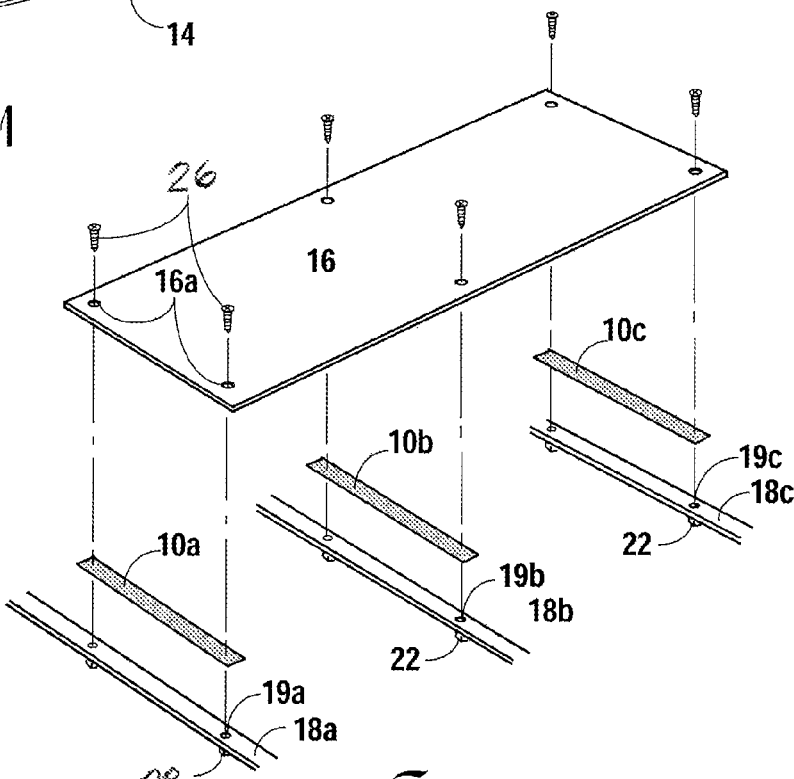
FIG. 2 illustrates in perspective view, the order of assembly of the gasket tape on the stringers (representing a base) with the placement of a workpiece (represented here, for example, by a floor panel) on the sticky upper surface of the gasket placed on the upper surface of the aircraft stringers.
Figure 2A:
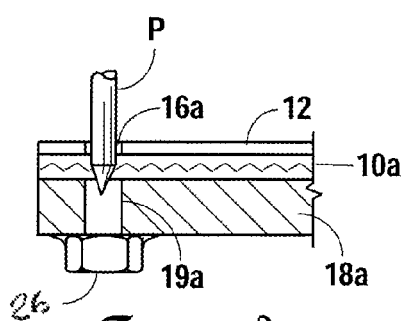
FIG. 2A is a partial cross-sectional view of the step of breaking a woven fabric in the gasket with a pointed instrument.
Figure 3:
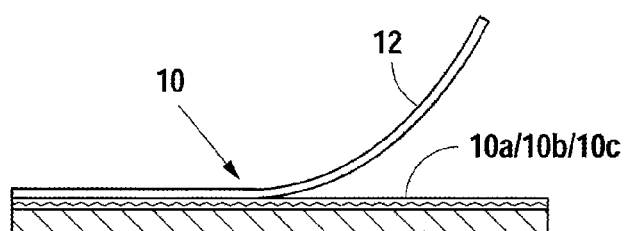
FIG. 3 is a close-up perspective view of a section of the polyurethane tape representing part of the materials used in Applicants' method.

An appropriate gasket for the practice of Applicants' method would be a sticky gasket that will stick to a first side of a base, as well as a workpiece, and effectively absorb vibration sound and provide an environmental seal between the two. In a preferred embodiment, polyurethane tape 10 is used, cut to lengths 10*a*/10*b*/10*c* to attach to aircraft stringers 18*a*/18*b*/18*c* as illustrated in FIGS. 2, 2A, and 3. A poly tape that may be used in the practice of Applicants' method is Hi-Tech Tape No. HT3935-7 available at Avdec.com.

In a preferred embodiment, the applicator is any squeeze bottle or the like and the release agent is isopropyl alcohol (typically about 99%), soapy water or any suitable surfactant/water combination. These tack release agents have been found, when the body 14 of the poly gasket tape 10 is in a hardness range of about 95 to about 110, to effectively act as a temporary release agent.

Turning now to the practice of, with the materials at hand, namely, polyurethane tape 10, spray applicator 22 with release agent 24 (see FIG. 4) therein, and in the environment set forth above in the drawings, a specific application of Applicants' general method as will be described below.

With the gasket tape 10 in hand, it is first cut to size such that it may lay on the stringers (FIG. 2), and typically to completely cover the stringers above which will lie floor panel 16, with the panel/stringer holes paired. As the tape is cut to length, it will be noted that there is typically a release film or cover 12 on one surface of the sticky body 14 and the tape may be cut to length with shears, a cutting instrument or any other appropriate means.

The tape is then carefully positioned and applied with a sticky side to the top surface of stringers 18*a*/18*b*/18*c*, and typically covering the holes 19*a*/19*b*/19*c* thereof. The tape is applied sticky side to base, skinned side up.

After all of the tape is placed on the upper surface of the stringers, the release film (skin) or cover 12 is removed therefrom, exposing the tacky upper surface of the applied gasket tape.

Figure 4:
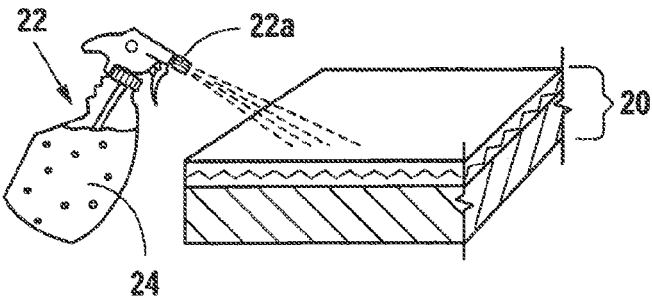
FIG. 4 is a perspective view that represents the wetting step of Applicants' present invention.

Following the film removal step (FIG. 3), Applicants perform the wetting step whereby spray applicator 22 typically with a nozzle 22*a* thereon is used to direct a spray S of release agent 24 to the upper surface of body 14 as seen in FIG. 4. Substantially coating the upper surface with the release agent 24 will render the upper surface temporarily unsticky until it substantially evaporates. This typically lasts several minutes and will provide the use time to complete the following step. The wetted assembly 20 is now ready for receipt of the floor panel thereon, which should be placed on the wetted gasket immediately upon wetting.

Figure 5A:
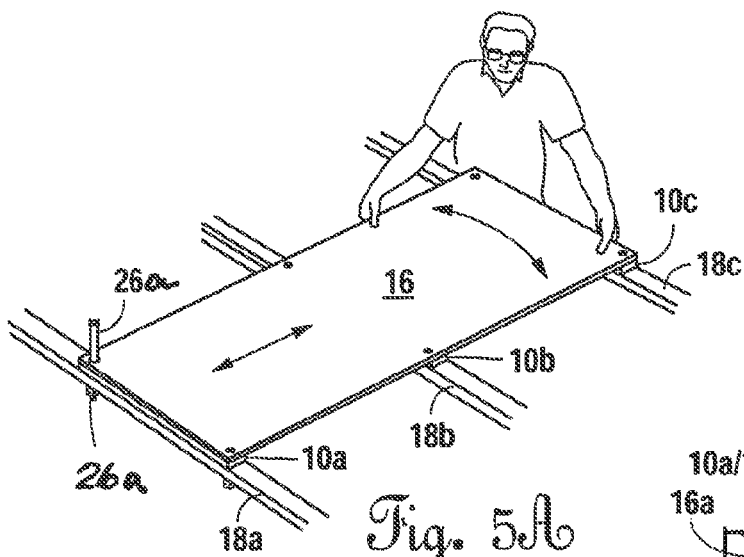
FIG. 5A is a perspective view of the laying and alignment step of Applicants' method.
Figure 6:
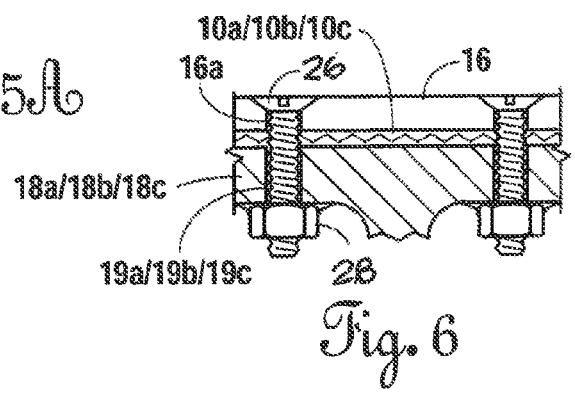
FIG. 6 illustrates in side elevation, a completed, aligned workpiece/gasket/base assembly aligned as set forth herein.

The next step includes the "lay and alignment" step (FIGS. 5 and 5A) where floor panel 16 is laid on the top surface of wetted body 14 of the gasket and positioned such that the holes 19*a*/19*b*/19*c* are aligned with holes 16*a* in the workpiece, here, floor panel 16.

When proper alignment occurs, the fasteners are positioned and driven through the gasket tape 10. Skeleton 10*b*, here, in a preferred embodiment woven fiberglass, may be broken with the use of the fasteners or a pointed instrument may be used prior to the application of the fasteners to the holes, such as a sharp pin or dowel. Indeed, as part of the lay and alignment step, a dowel 26*a* (see FIG. 5A) may be inserted into one of the corner located fastener holes and the pivoting of the floor panel 16 about such junction may provide for an easy method of aligning the holes while the upper surface is still wetted with release agent. After alignment, the workpiece is left for a period of time until the alcohol or other tack release agent evaporates.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. A method for positioning a removable workpiece on a base with a gasket between the workpiece and the base, the gasket having a skinned side covering a sticky body and an uncovered sticky side, the method comprising the steps of:
   providing the gasket, a liquid tack release agent, and a release agent applicator;
   applying the sticky side of the gasket to the base;
   removing the skin from a top surface of the gasket;
   spraying the top surface of the gasket with the release agent;
   manually laying the workpiece on the wetted top surface of the gasket;
   aligning the workpiece to a predetermined alignment with the base; and
   allowing the release agent to dry.

2. The method of claim 1, wherein the workpiece and the base each have a multiplicity of fastener holes therein and wherein the aligning step includes the step of aligning the holes of the workpiece and the fasteners.

3. The method of claim 2, wherein the workpiece is an aircraft floor panel and the base is an aircraft stringer.

4. The method of claim 2, wherein the gasket has a skeleton and further including, following the removing step, the step of creating holes in the skeleton at any points where the gasket overlaps the holes.

5. The method of claim 2, wherein the aligning step further includes the step of placing a member in a pair of aligned holes and moving the workpiece about the member to align the remaining holes of the workpiece with the holes of the stringer.

6. The method of claim 3, wherein the gasket is a polyurethane gasket tape and the applying step includes applying the gasket tape sticky side down on the stringer.

7. The method of claim 6, wherein the liquid tack release agent is an alcohol.

8. The method of claim 6, wherein the liquid tack release agent is a solution of a surfactant and water.

9. A method for positioning a removable workpiece on a base with a gasket between the workpiece and the base, the gasket having a skinned side covering a sticky body and an uncovered sticky side, the method comprising the steps of:
   providing the gasket, a liquid tack release agent, and a release agent applicator;
   applying the sticky side of the gasket to the base;
   removing the skin from a top surface of the gasket;
   spraying the top surface of the gasket with the release agent;
   manually laying the workpiece on the wetted top surface of the gasket;

aligning the workpiece to a predetermined alignment with the base; and
allowing the release agent to dry;
 wherein the workpiece and the base each have a multiplicity of fastener holes therein and wherein the aligning step includes the step of aligning the holes of the workpiece and the fasteners;
 wherein the workpiece is an aircraft floor panel and the base is an aircraft stringer;
 wherein the gasket is a polyurethane gasket tape and the applying step includes applying the gasket tape sticky side down on the stringer;
 wherein the liquid tack release agent is an alcohol;
 wherein the gasket has a skeleton and further including, following the removing step, the step of creating holes in the skeleton at any points where the gasket overlaps the holes; and
 wherein the aligning step further includes the step of placing a member in a pair of aligned holes and moving the workpiece about the member to align the remaining holes of the workpiece with the holes of the stringer.

\* \* \* \* \*